United States Patent [19]

Chen

[11] Patent Number: 5,790,508
[45] Date of Patent: Aug. 4, 1998

[54] MULTIDISK CHANGER

[75] Inventor: Chun-Hsien Chen, Hsinchu, Taiwan

[73] Assignee: Industrial Technology Research Institute, Hsinchu, Taiwan

[21] Appl. No.: 772,386

[22] Filed: Dec. 23, 1996

[30] Foreign Application Priority Data

Aug. 20, 1996 [TW] Taiwan ................................ 85212748

[51] Int. Cl.$^6$ .................................................. G11B 17/22
[52] U.S. Cl. ............................ 369/178; 369/36; 369/191
[58] Field of Search ........................... 369/36, 191, 192, 369/178, 75.1, 75.2

[56] References Cited

U.S. PATENT DOCUMENTS

| | | | |
|---|---|---|---|
| 5,280,463 | 1/1994 | Okajima et al. | 369/36 |
| 5,463,611 | 10/1995 | Kim | 369/191 |
| 5,528,567 | 6/1996 | Kim | 369/37 |
| 5,574,705 | 11/1996 | Suzuki | 369/36 |

*Primary Examiner*—Stuart S. Levy
*Assistant Examiner*—William J. Klimowicz
*Attorney, Agent, or Firm*—W. Wayne Liauh

[57] ABSTRACT

The present invention relates to a multidisk changer, which can be installed in a common CD-player, CD-ROM, LD-player or Video-CD player, comprising: a disk box, a curved slot plate, a disk selector, an optical pick-up, a linear slot plate, a box holder and a bottom plate. A plurality of disk trays can be placed in the disk box to store CD disks. Through the accommodation of the configurations of the curved slots of the curved slot plate and those of the linear slot of the linear slot plate, the disk selector and optical pick-up can be driven simultaneously by a disk selection motor to move sequentially to accomplish two actions: "disk selection" and "the up-and-down motion of the optical pick-up". In the meantime, to make use of a disk loading motor to accomplish the action of "disk loading and unloading". Since the present invention uses only two drive motors, it has the advantages of lower number of components used, lower cost, lower energy consumption, being simpler in design and easier in manufacturing.

6 Claims, 5 Drawing Sheets

MULTIDISK CHANGER

FIELD OF INVENTION

The present invention relates to a multidisk changer, and more particularly is suitable to be installed in a common CD-player, CD-ROM, LD-player or Video-CD player etc.

BACKGROUND OF THE INVENTION

Generally speaking, there are three kinds of basic functions which must be accomplished by a conventional multidisk changer: "disk selection", "disk loading and unloading" and "up-and-down motion of the optical pick-up". The usual way to perform said three functions is to make use of three motors acting individually. However, since said usual way needs three motors to complete said three functions, not only various elements cooperating to said motors are needed but also the energy consumption is relatively high. Besides, the feedback circuit controlling the sequential motion of the three motors is complicated. Therefore, it can neither accommodate the concept of environmental protection nor meet the requirements of energy saving. In addition, the manufacturing cost is relatively higher too.

A disk changing apparatus has been disclosed in U.S. Pat. No. 5,384,760 wherein a cam member and three motors are used to accomplish said actions :—"disk Selection", "disk loading and unloading" as well as "up-and-down motion of the optical pick-up". However, the design and motion mode of the cam member are rather complicated such that it must rely on precise and complicated calculation, design as well as metal working to attain the actions of accurate positioning and thereby, the manufacturing cost is higher and, therefore, needs to be improved.

SUMMARY OF THE INVENTION

In view of the aforesaid disadvantages, it is therefore the primary object of the present invention to provide a multidisk changer that comprises a disk box, a curved slot plate, a disk selector, an optical pick-up, a linear slot plate, a box holder, a gear set, and a bottom plate where said disk selector and the optical pick-up are pivoted to the linear slot of the linear slot plate and to the curved slot of the curved slot plate respectively by use of the protruded pins. Through the corresponding locational relationship between the curved slot and the linear slot, the disk selector and the optical pick-up can be driven simultaneously along the linear slot to sequentially perform the positioning action of up-and-down motion by merely using a drive motor set only. Another loading motor set is applied to drive the disk tray of the disk box to perform the disk loading and unloading action. By accommodating the use of simple curved slot and linear slot, only two motors are needed to accomplish the three actions: "disk selection", "disk loading and unloading" as well as "the up-and-down motion of the optical pick-up". Therefore, by using only two motors in the present invention, not only the number of components is reduced and energy consumption is less, but also the structural design of the curved slot is simplified and the positioning work is also simplified. Hence, the metal working, manufacturing and assembly work referring to the present invention are all very convenient, besides, the cost is much lower as well.

The foregoing features of the present invention may be more fully understood from the following detailed description, read in conjunction with the accompanying drawings, wherein:

BRIEF DESCRIPTION OF THE DRAWINGS

FIG. I is an isometric view of the multidisk changer of the present invention.

DETAILED DESCRIPTION OF THE INVENTION

Figure 1:
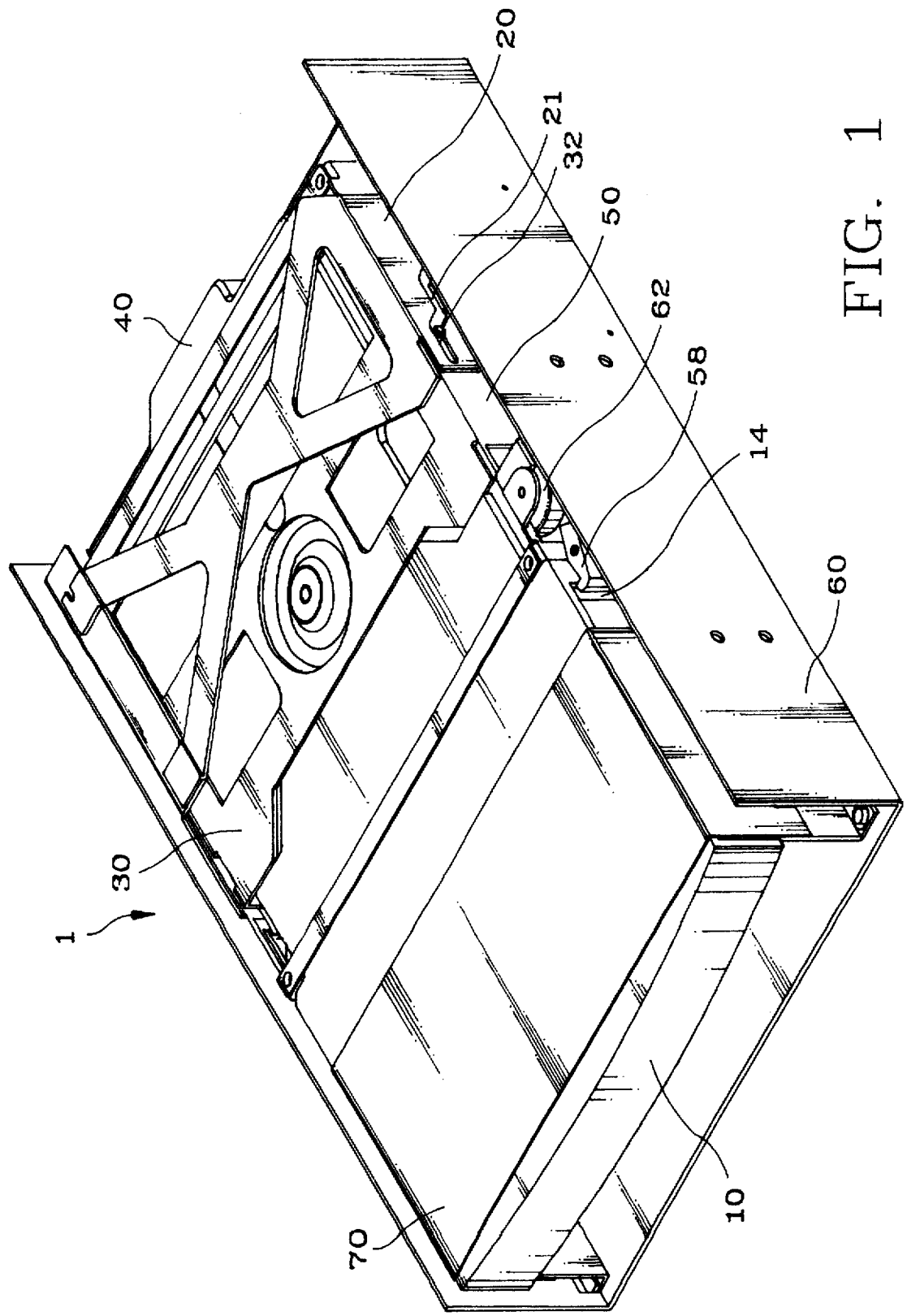
Figure 2:
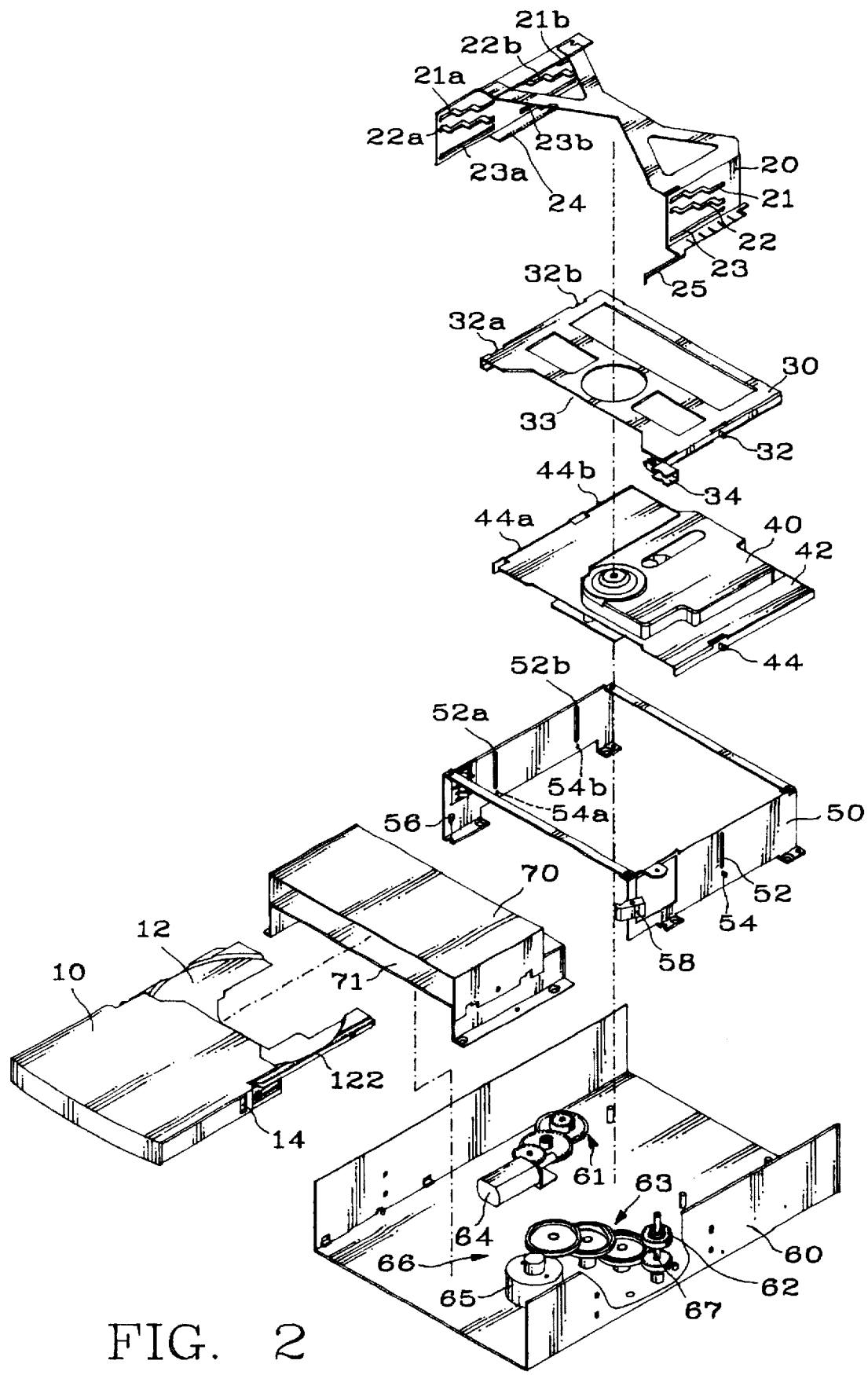
FIG. 2 is an explored view of the multidisk changer of the present invention .

Referring to FIG. 1 and FIG. 2, the multidisk changer 1 of the present invention comprises a disk box 10, a curved slot plate 20, a disk selector 30, an optical pick-up 40, a linear slot plate 50, a box holder 70, a gear set 66 and a bottom plate 60.

Figure 3:
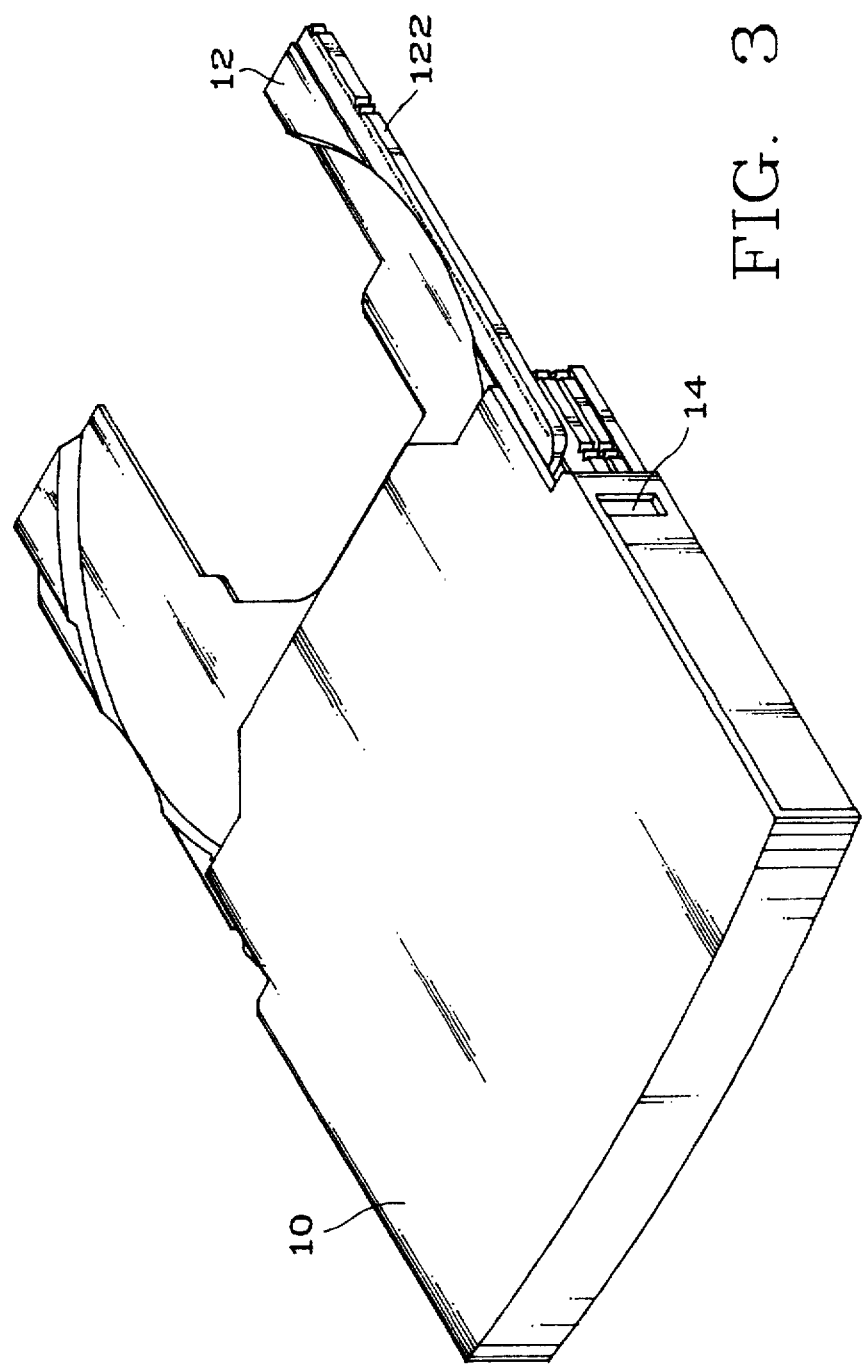
FIG. 3 is an isometric view of the disk box of the present invention.

There are several disk trays 12 (as shown in FIG. 3) placed in the disk box 10 wherein each of the disk tray 12 is an independent body that can be taken out or placed into the disk box 10. Besides, there is a tray rack 122 set up at one side of the disk tray 12 so as to enable any disk tray 12 to perform slip-out and retreat action by engaging the tray rack 122 with the disk loading gear 62 (as shown in FIG. 2). Therefore, the height of the disk loading gear 62 will directly determine the possibility of a specific disk tray 12 placed in the disk box 10 being sent into the disk selector 30 to facilitate the optical pick-up 40 being able to read data from a CD (not shown in the figures).

Figure 4:
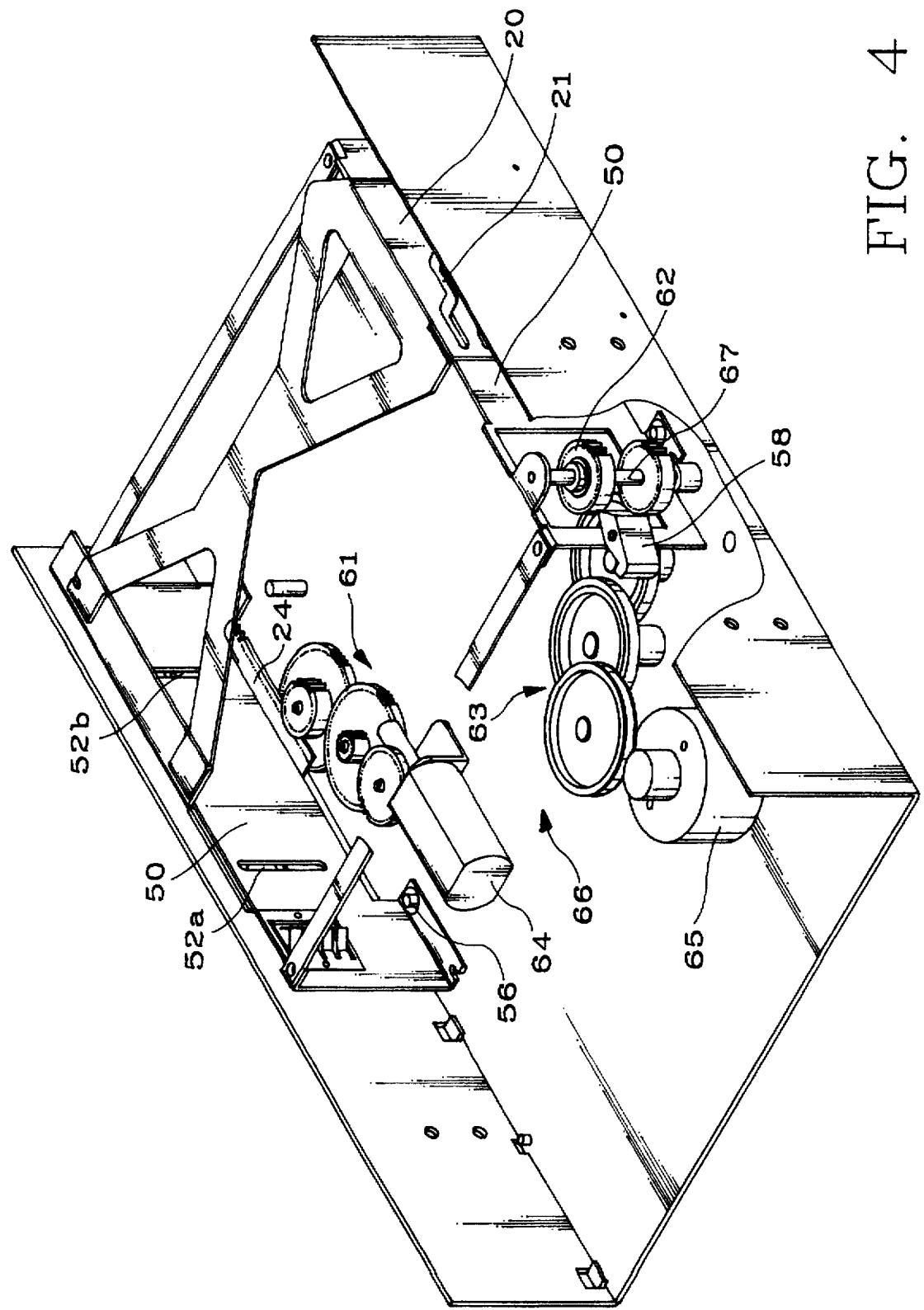
FIG. 4 is a schematic drawing showing the assembly of the curved slot plate, the linear slot plate and the bottom plate of the present invention.

Referring again to FIG. 2 and FIG. 4, the curved slot plate 20 is provided with a disk selection rack 24; first curved slots 21, 21a and 21b; second curved slots 22, 22a and 22b; horizontal slots 23, 23a and 23b; and a disk box unloading rod 25. The curved slot plate 20 encases the linear slot plate 50 which is fixedly screwed on the bottom plate 60 (as shown in FIG. 4). The linear slot plate 50 is provided with linear slots 52, 52a, 52b and third protruded pins 54, 54a, 54b, while the bottom plate 60 is furnished with said gear set 66 which comprises a first gear set 61, a disk selection motor 64 used to drive the first gear set 61, a second gear set 63 and a disk loading motor 65 used to drive said second gear set 63. The second gear set 63 is engaged with the disk loading gear 62 through a transmission shaft 67 which can transmit power generated by the disk loading motor 65. Besides, the disk loading gear 62 is pivotally engaged with the transmission shaft 67 so that the disk loading gear 62 can slide up-and-down freely along the direction of the transmission shaft 67.

As the curved slot plate 20 encases the linear slot plate 50, the disk selection rack 24 of the curved slot plate 20 is engaged with the first gear set 61, and also the third protruded pins 54, 54a and 54b can be pivotally mounted on the tracks formed by the horizontal slots 23, 23a and 23b respectively. Hence, through the transmission of the first gear set 61, the curved slot plate 20 can be driven by the disk selection motor 64 so as to slide back-and-forth on the linear slot plate 50 along the direction of the horizontal slots 23.

The front end of the disk selector 30 is provided with a loaded disk containing frame 33 which is about the same size as the width of the disk tray 12. The disk selector 30 is provided with first protruded pins 32, 32a and 32b which are pivotally mounted with both the linear slots 52, 52a, 52b and the ladder-like first curved slots 21, 21a, 21b respectively. Further, provided at one corner of the front end of the disk selector 30 is a gear switch 34 which can exactly cap on the disk loading gear 62 (as shown in FIG. 1). As the first protruded pins 32, 32a, 32b are constrained by the configurations of the first curved slots 21, 21a, 21b and the linear slots 52, 52a 52b corresponding to the fitted positions, the gear switch 34 can move up-and-down and perform positioning work when the disk selection motor 64 drives the curved slot plate 20 to slide back-and-forth. Therefore, the disk selector 30 can perform up-and-down positioning work to facilitate the loaded disk containing frame 33 to exactly align with a certain disk tray 12 in the disk box 10. Since the gear switch 34 at the front end of the disk selector 30 caps on the disk loading gear 62, accordingly, the up-and-down motion and the positioning work of the disk selector 30 can, in the mean time, drive the disk loading gear 62 to engage exactly with the tray rack 122 of a certain disk tray 12 in the disk box 10 so as to enable the disk tray 12 to be moved into the disk selector 30 through the loaded disk containing frame 33 or retreat back into the disk box 10, by use of the disk loading motor 65.

The optical pick-up 40 is the one that comprises various optical and electronic components used to pick up the data in CD. The topics referring to the optical pick-up 40 will not be reiterated here since the main structure of the optical pick-up 40 is the same as those of prior art and performs no part in the present invention. The optical pick-up 40 is fixed to a flat plate 42 provided with second protruded pins 44, 44a, 44b which are respectively pivotally engaged with the linear slots 52, 52a 52b and the second curved slots 22, 22a, 22b which are in ladder-like configurations. As the second protruded pins 44, 44a, 44b are constrained by the configurations of the linear slots 52, 52a 52b and second curved slots 22, 22a, 22b, the optical pick-up 40 can move up-and-down and perform positioning work when the disk selection motor 64 drives the curved slot plate 20 to slide back-and-forth. Therefore, the optical pick-up 40 can be driven by the disk selection motor 64 to perform up-and-down motion and positioning work to facilitate the action of picking up data in the CD contained in the disk selector 30.

Referring again to FIG. 1 and FIG. 2, the box holder 70 is rigidly attached to the bottom plate 60 and is provided with an opening 71 which can contain the disk box 10. Besides, one side of the front end of the linear slot plate 50 is provided with a spring-loaded hook lock 58. When the disk box 10 is pushed into the box holder 70 through the opening 71, the disk loading gear 62 can exactly engage with the tray rack 122 of a certain disk tray 12, and the spring-loaded hook lock 58 can also exactly lock in the concave groove 14 at one side of the disk box 10 so as to lock the disk box 10 in position to facilitate the multidisk changer 1 to execute the three actions: —"disk selection", "disk loading and unloading" and "the up-and-down motion of the optical pick-up". Also, there is an unloading rod 25 set up at one side of the curved slot plate 20. As the curved slot plate 20 on the linear slot plate 50 moves forward (toward the left) till the front end, the unloading rod 25 can exactly press against the rear end of the springloaded hook lock 58 to unlock it from the concave groove 14 of the disk box 10, thereby, the disk box 10 and the disk tray 12 and CD (not shown in the figures) can then be unloaded freely from the box holder 70.

Figure 5:
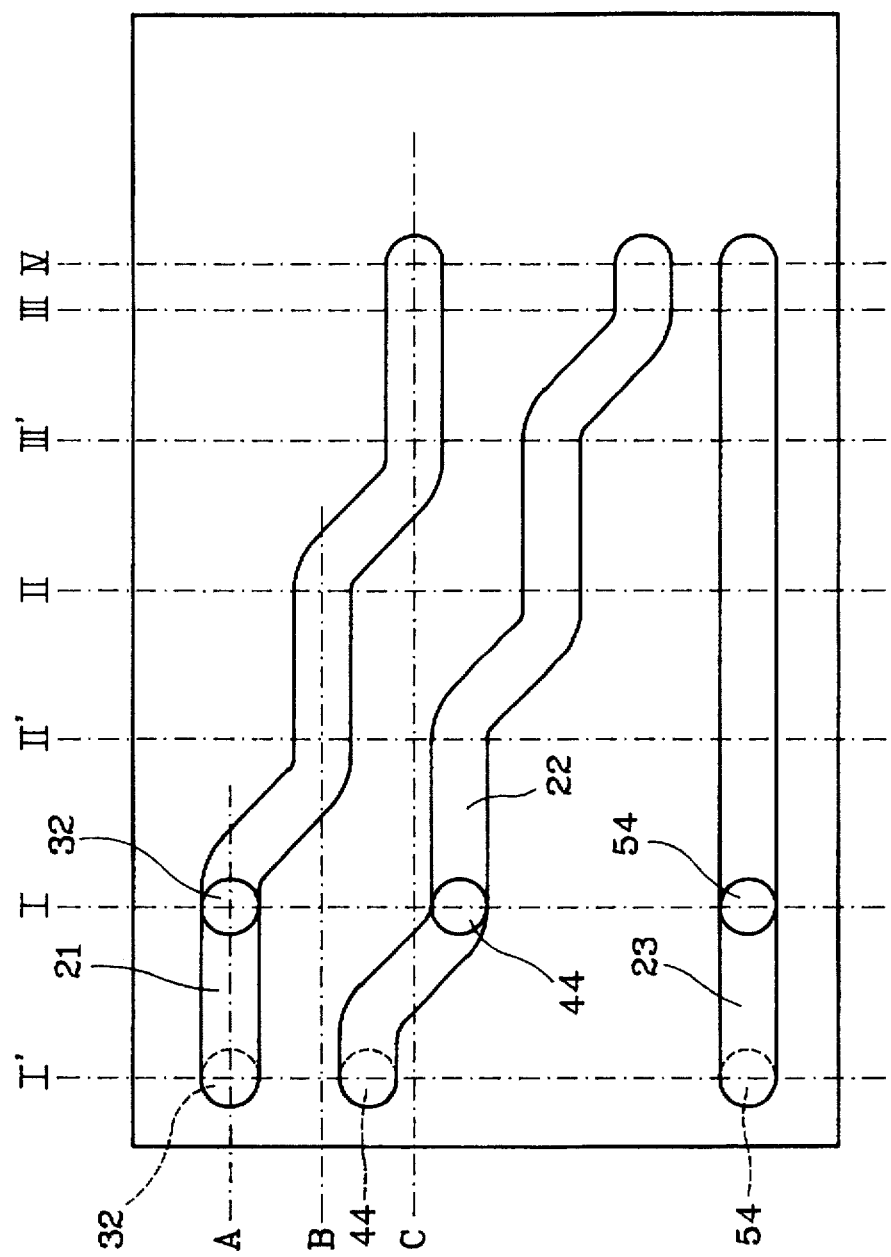
FIG. 5 is a schematic motion diagram of the curved slot plate of the present invention.

Referring to FIG. 1 and FIG. 5, as the disk box 10 is placed into the box holder 70 till it is positioned, the spring-loaded hook lock 58 will automatically clip to lock into the concave groove 14 to lock the disk box 10. At this moment, take the right hand view of the of the curved slot plate 20 as an example (as shown in FIG. 5), it shows the displacement variation in the up-and-down direction of the disk selector 30 (i.e. same as the location of the first protruded pin 32) and the optical pick-up 40 (i.e. same as the location of the second protruded pin 44) when the curved slot plate 20 and the linear slot plate 50 are in various relative positions, where the symbols A , B , C in FIG. 5 represent the height positions of the first, second and third disk tray 12 in the disk box 10 respectively. As shown in FIG. 5, when the disk box 10 is first placed into the box holder 70 till it is positioned, the relative position of the curved slot plate 20 and the linear slot plate 50 is at position I. In the mean time, the height position of the First protruded pin 32 (i.e. also is the height of the disk selector 30) is at height A (i.e. also is the height of the first disk tray 12), thereby, the disk loading gear 62 can engage with the tray rack 122 of the first disk tray 12. Besides, the height position of the second protruded pin 44 (i.e. also is the height of the optical pick-up 40) is lower than which of the optical pick-up 40 in normal operating state so as to leave a room for the first disk tray stored in the disk box 10 to be driven into the disk selector 30 freely without colliding or rubbing with the optical pick-up 40. Once the first disk tray 12 is sent into the disk selector 30 and is positioned, the disk selection motor 64 can drive the curved slot plate 20 to retreat (move toward the right) through the transmission of the first gear set 61 to make the relative position between the curved slot plate 20 and the linear slot plate 50 at position I'. At this moment, the height of the disk selector 30 remains unchanged but the height of the optical pick-up 40 raises up to the one as its normal operation state of picking up data, thereby, it can then perform the action of picking up data in the CD located in the first tray 12. Similarly, when one intends to retreat the first disk tray 12, first of all, the curved slot plate 20 must be advanced to (moved toward the left) the I position to make the height of the optical pick-up 40 slightly lower, thereafter, drive the disk loading motor 65 to retreat the first disk tray 12 from the disk selector 30 into the disk box 10.

When one intends to pick up the data in the CD contained in the second disk tray in disk box 10, one first advances the curved slot plate 20 forward (toward the left) until it is in II position corresponding to the relative position of the linear slot 52 of the linear slot plate 50, thereby, the height of both the disk selector 30 and disk loading gear 62 is exactly at the height of the second disk tray, and the optical pick-up 40 is also at a relatively lower safety height. After the second disk tray is sent into the disk selector 30 and is well positioned, the curved slot plate 20 can be retreated back (toward the right) to the II' position to raise the optical pick-up 40 to the operating location to facilitate the action of picking up the data in the CD contained in the second disk tray.

Similarly, when one intends to pick up the data of the CD in the third disk tray, one first advances the curved slot plate 20 forward (toward the left) until it is in the III position and loads the third disk tray into the disk selector 30 until it is positioned, then retreats (toward the right) the curved slot plate 20 again to the III' position to enable the optical pick-up 40 to be raised up until it is positioned, thereby, to facilitate the data pick-up up in the CD.

Also, it is known from the curve layout of the first and second curved slot 21, 22 in the curved slot plate 20 shown in FIG. 5 that, as the curved slot plate 20 advances forward (toward the left), the disk selector 30 will not descend from its height position until the optical pick-up 40 descends slightly first from its height position, on the contrary, as the curved slot plate 20 retreats (toward the right), the position of disk selector 30 will ascend before the position of the optical pick-up 40 does. Therefore, there is no concern over the damage of the precision electronic and optical devices of the optical pick-up 40 resulted from the collision owing to the errors during the process of their up-and-down movements.

In addition, the take-out action of the disk box 10 will enable the curved slot plate 20 to advance (toward the left) to the IV position. At this moment, the front end of the unloading rod 25 on the curved slot plate 20 will push the rear end of the spring-loaded hook lock 58 to enable the front end of spring-loaded hook lock 58 to get out of the concave groove 14, thereby, the disk box 10 can then be taken out from the box holder 70.

To summarize the above-mentioned statements, one can see that the multidisk changer 1 uses only two sets of drive motors to accomplish three actions: —"disk selection", "disk loading and unloading" as well as the "up-and-down motion of the optical pick-up" where the disk loading motor 65 plays the role of driving the disk tray 12 to perform the disk loading and unloading action, and the disk selection motor 64 can perform two actions: —"disk selection" and the "up-and-down motion of the optical pick-up". Thereby, it can cut down the number of drive motors and their auxiliary components which not only can simplify their structure and assembling process but also reduce the energy consumption. Besides, the present invention makes use of the corresponding positions between the curved slot plate 20 and the linear slot plate 50 and the accommodation of the configurations of the curved slots 21, 22 and linear slots 52 to accomplish the movement and positioning of both the disk selector 30 and the optical pick-up 40. The structure of the components of the curved slot plate 20 and linear slot plate 50 are very simple and the design and metal working of the curved slots 21, 22 are very simple too, therefore, it possesses the advantages of being simple in structure, easy in manufacturing as well as lower in cost.

Although the present invention has been illustrated and described previously with reference to the preferred embodiments thereof, it should be appreciated that it is in no way limited to the details of such embodiments, but is capable of numerous modification within the scope of the appended claims, for instance, as shown in FIG. 2 and FIG. 3 of the present invention, although the disk box 10 contains three disk trays 12 and the configuration of the curved slots 21, 22 applied only in the operation with three disk trays, one needs only to enlarge the dimension of the disk box 10 to be able to contain disk tray 12 with more disks and to extend the curve configurations of the curved slots 21, 22 on the curved slot plate 20 in accordance with the same design trend to increase the number of ladder-like steps to accommodate the execution of four or five or even more disks in the multidisk changer.

What is claimed is:

1. A multidisk changer comprising:
    a curved slot plate which comprises first curved slots, second curved slots, horizontal slots and a disk selection rack wherein said first and second curved slots being in ladder-like configurations;
    a linear slot plate which comprises linear slots and third protruded pins wherein said curved slot plate encases on said linear slot plate and the third protruded pins are pivotally engaged within the horizontal slots to enable the curved slot plate to slide back-and-forth on the linear slot plate;
    a disk selector which comprises a loaded disk containing frame, a gear switch and first protruded pins wherein the first protruded pins are pivotally mounted with both the linear slots and the first curved slots;
    an optical pick-up which is rigidly attached to a flat plate, wherein said flat plate is provided with second protruded pins which are pivotally mounted with both the linear slots and the second curved slots;
    a box holder;
    a bottom plate which is rigidly attached with said box holder and linear slot plate; and
    a gear set, which is provided on said bottom plate, comprises a first gear set, a disk selection motor, a second gear set, a disk loading motor, a transmission shaft and a disk loading gear wherein said first gear set engaging with said disk selection rack can drive said curved slot plate on said linear slot plate to perform back-and-forth motion by means of said disk selection motor, and said disk loading gear is encased in the gear switch and is pivotally engaged with the transmission shaft mounted with the second gear set which can be driven by the disk loading motor;
    wherein said disk selection motor is the sole means for moving said disk selector and said optical pick-up.

2. A multidisk changer as claimed in claim 1, wherein said multidisk changer further comprises a disk box which can contain a plurality of disk trays.

3. A multidisk changer as claimed in claim 2, wherein one side of said disk tray is provided with a tray rack.

4. A multidisk changer as claimed in claim 2, wherein one side of the disk box is provided with a concave groove and one side of the front end of said linear slot plate is provided with a spring-loaded hook lock such that when said disk box is loaded into said box holder until it is positioned, said spring-loaded hook lock is adapted to lock into said concave groove to lock said disk box.

5. A multidisk changer as claimed in claim 4, wherein one side of said curved slot plate is equipped with an unloading rod such that when said curved slot plate moves forward toward said disk box, said unloading rod can exactly press the rear end of said spring-loaded hook lock to unlock said hook lock from the concave groove.

6. A multidisk changer as claimed in claim 1 which is adapted to be installed in a common CD-player, CD-ROM, LD-player or Video-CD player.

* * * * *